United States Patent
Liu et al.

(10) Patent No.: US 8,414,783 B2
(45) Date of Patent: Apr. 9, 2013

(54) METHOD OF FORMING DOUBLE-SIDED PATTERNS IN A TOUCH PANEL CIRCUIT

(75) Inventors: Chen-Yu Liu, Taoyuan County (TW); Ching-Yi Wang, Taoyuan County (TW); Cheng-Ping Liu, Taoyuan County (TW); Lu-Hsin Li, Taoyuan County (TW)

(73) Assignee: TPK Touch Solutions Inc., Taipei (TW)

( * ) Notice: Subject to any disclaimer, the term of this patent is extended or adjusted under 35 U.S.C. 154(b) by 905 days.

(21) Appl. No.: 12/509,430

(22) Filed: Jul. 24, 2009

(65) Prior Publication Data

US 2010/0102027 A1    Apr. 29, 2010

(30) Foreign Application Priority Data

Oct. 27, 2008    (TW) ................................ 97141167 A

(51) Int. Cl.
*B44C 1/22*    (2006.01)

(52) U.S. Cl.
USPC ................ 216/12; 216/13; 216/24; 430/57.1; 430/64

(58) Field of Classification Search .................. None
See application file for complete search history.

(56) References Cited

U.S. PATENT DOCUMENTS

| | | | |
|---|---|---|---|
| 6,037,005 A | 3/2000 | Moshrefzadeh et al. | |
| 6,309,944 B1 * | 10/2001 | Sheng et al. | 438/401 |
| 6,653,055 B1 | 11/2003 | Meier et al. | |
| 7,115,435 B2 | 10/2006 | Yuri | |
| 7,887,997 B2 * | 2/2011 | Chou | 430/312 |
| 2002/0048730 A1 | 4/2002 | Hatori et al. | |
| 2007/0269936 A1 | 11/2007 | Tanaka et al. | |
| 2008/0088601 A1 | 4/2008 | Chien | |
| 2008/0176042 A1 * | 7/2008 | Nashiki et al. | 428/172 |
| 2011/0104480 A1 * | 5/2011 | Malekos et al. | 428/336 |
| 2011/0151215 A1 * | 6/2011 | Kobayashi | 428/212 |

FOREIGN PATENT DOCUMENTS

| | | |
|---|---|---|
| CN | 1549004 A | 11/2004 |
| JP | 4264613 A | 9/1992 |

\* cited by examiner

*Primary Examiner* — Allan Olsen
(74) *Attorney, Agent, or Firm* — Gokalp Bayramoglu; Anna Tsang

(57) ABSTRACT

A method of forming double-sided patterns in a touch panel circuit is disclosed. A first conductive layer and a second conductive layer are respectively formed on both sides of a substrate. A blocking layer is formed on a top surface of the first conductive layer for blocking ultraviolet (UV) light. A first photoresist layer is formed on a top surface of the blocking layer, and a second photoresist layer is formed on a bottom surface of the second conductive layer. Accordingly, two sides of the substrate may be exposed, developed and etched at the same time, thereby substantially simplifying the process of manufacturing the touch panel circuit.

24 Claims, 15 Drawing Sheets

METHOD OF FORMING DOUBLE-SIDED PATTERNS IN A TOUCH PANEL CIRCUIT

CROSS-REFERENCE TO RELATED APPLICATIONS

The entire contents of Taiwan Patent Application No. 097141167, filed on Oct. 27, 2008, from which this application claims priority, are incorporated herein by reference.

BACKGROUND OF THE INVENTION

1. Field of the Invention

The present invention generally relates to a method of forming a touch panel circuit, and more particularly to a method of forming double-sided patterns in the touch panel circuit by sputtering, exposure, developing and etching.

2. Description of the Related Art

Resistive and capacitive touch panels are two common types of touch panel technology. The capacitive touch panel usually includes double-sided patterns in a touch panel circuit. The patterns are manufactured by stacking a number of transparent conductive materials (such as indium tin oxide (ITO)) on two sides of a glass substrate using photolithography technique such as exposure, developing and etching. Specifically, the patterns usually include a top conductive film formed on the top surface of the glass substrate and a bottom conductive film formed on the bottom surface of the glass substrate. A metal circuit layer is also formed on the peripheral edge of the glass substrate. A touch on the capacitive touch panel results in capacitance change between the top conductive film and the bottom conductive film, and the induced current and the corresponding position due to the capacitance change can be detected by the metal circuit layer.

The double-sided patterns of the conventional touch panel circuit are manufactured by firstly vacuum sputtering a top conductive layer and a bottom conductive layer, respectively, on the top surface and the bottom surface of the glass substrate. Subsequently, a top photoresist layer is applied to the top conductive layer, and a protecting layer is applied to the bottom conductive layer. The top photoresist layer is then covered with a patterned photomask, followed by exposing to ultraviolet (UV) and developing the top photoresist layer, thereby exposing regions of the top conductive layer. After etching the exposed regions, the top conductive film is thus formed in the top conductive layer, followed by removing the remaining photoresist on the top conductive film and removing the protecting layer on the bottom conductive layer.

Afterwards, a bottom photoresist layer is applied to the bottom conductive layer, and a protecting layer is applied to the top conductive layer. The bottom photoresist layer is then covered with a patterned photomask, which is aligned according to the top conductive film, which is captured by an imaging device (such as a charge-coupled device (CCD)). The bottom photoresist layer is then exposed to UV and developed, thereby exposing regions of the bottom conductive layer. After etching the exposed regions, the bottom conductive film is thus formed in the bottom conductive layer, followed by removing the remaining photoresist on the bottom conductive film and removing the protecting layer on the top conductive layer.

The conventional manufacturing method described above requires repetitive photolithography processes, including multiple steps of forming and removing the photoresist/protecting layers, and multiple steps of developing and etching. In addition to at least two photolithography processes in the formation of the top and bottom conductive films, a further photolithography process is needed in the formation of the metal circuit layer, thereby altogether consuming substantial time and cost in the manufacturing.

The conventional photolithography technique described above is disclosed, for example, in US Patent Application Nos. 2007/0269936, 2002/0048730, U.S. Pat. No. 6,037,005 and China Patent No. 1549004. However, as no double-sided etching technique has ever been disclosed with respect to opto-electronic devices, a need has thus arisen to propose a novel method for overcoming the disadvantages mentioned above.

SUMMARY OF THE INVENTION

In view of the foregoing, embodiments of the present invention provide a method of forming double-sided patterns in a touch panel circuit, particularly a method of performing exposure, developing and etching on both sides of a glass substrate at the same time, in order to simplify the process of manufacturing the double-sided patterns in the touch panel circuit.

According to a first embodiment of the present invention, a substrate is provided with a first conductive layer and a second conductive layer respectively formed on both sides of the substrate. A blocking layer is formed on a top surface of the first conductive layer for blocking ultraviolet (UV) light. A first photoresist layer is formed on a top surface of the blocking layer, and a second photoresist layer is formed on a bottom surface of the second conductive layer. The first photoresist layer and the second photoresist layer are exposed to ultraviolet lights respectively, wherein the ultraviolet lights from either side of the substrate are blocked from each other by the blocking layer. Both sides of the substrate are developed such that regions of the first conductive layer and the second conductive layer are exposed. The exposed regions of the first conductive layer and the second conductive layer are etched at the same time, thereby resulting in a first conductive film in the first conductive layer, and resulting in a second conductive film in the second conductive layer.

According to another embodiment alternative to the first embodiment, a substrate is provided with a blocking layer formed on a top surface of the substrate. A first conductive layer is formed on a top surface of the blocking layer, and a second conductive layer is formed on a bottom surface of the substrate. A first photoresist layer is formed on a top surface of the first conductive layer, and a second photoresist layer is formed on a bottom surface of the second conductive layer. The first photoresist layer and the second photoresist layer are exposed to ultraviolet lights respectively, wherein the ultraviolet lights from either side of the substrate are blocked from each other by the blocking layer. Both sides of the substrate are developed such that regions of the first conductive layer and the second conductive layer are exposed. The exposed regions of the first conductive layer and the second conductive layer are etched at the same time, thereby resulting in a first conductive film in the first conductive layer, and resulting in a second conductive film in the second conductive layer.

According to still another embodiment alternative to the first embodiment, a substrate is provided with a blocking layer formed on a bottom surface of the substrate. A first conductive layer is formed on a top surface of the substrate, and a second conductive layer is formed on a bottom surface of the blocking layer. A first photoresist layer is formed on a top surface of the first conductive layer, and a second photoresist layer is formed on a bottom surface of the second conductive layer. The first photoresist layer and the second photoresist layer are exposed to ultraviolet lights respectively, wherein the ultraviolet lights from either side of the substrate are blocked from each other by the blocking layer. Both sides of the substrate are developed such that regions of the first conductive layer and the second conductive layer are exposed. The exposed regions of the first conductive layer and the second conductive layer are etched at the same time, thereby resulting in a first conductive film in the first conductive layer, and resulting in a second conductive film in the second conductive layer.

According to a further embodiment alternative to the first embodiment, a substrate is provided with a first conductive layer and a second conductive layer respectively formed on both sides of the substrate. A blocking layer is formed on a bottom surface of the second conductive layer for blocking ultraviolet (UV) light. A first photoresist layer is formed on a top surface of the first conductive layer, and a second photoresist layer is formed on a bottom surface of the blocking layer. The first photoresist layer and the second photoresist layer are exposed to ultraviolet lights respectively, wherein the ultraviolet lights from either side of the substrate are blocked from each other by the blocking layer. Both sides of the substrate are developed such that regions of the first conductive layer and the second conductive layer are exposed. The exposed regions of the first conductive layer and the second conductive layer are etched at the same time, thereby resulting in a first conductive film in the first conductive layer, and resulting in a second conductive film in the second conductive layer.

According to a second embodiment of the present invention, a substrate is provided with a first conductive layer and a second conductive layer respectively formed on both sides of the substrate. A metal layer is formed on a top surface of the first conductive layer for blocking ultraviolet (UV) light. A first photoresist layer is formed on a top surface of the metal layer, and a second photoresist layer is formed on a bottom surface of the second conductive layer. The first photoresist layer and the second photoresist layer are exposed to ultraviolet lights respectively, wherein the ultraviolet lights from either side of the substrate are blocked from each other by the metal layer. Both sides of the substrate are developed such that regions of the metal layer and the second conductive layer are exposed. The exposed regions of the metal layer and the second conductive layer are etched, thereby resulting in a metal circuit layer in the metal layer, and resulting in a second conductive film in the second conductive layer. A third photoresist layer is formed on top surfaces of the metal circuit layer and the first conductive layer. The third photoresist layer is exposed and developed such that regions of the first conductive layer are exposed. The exposed regions of the first conductive layer are etched, thereby resulting in a first conductive film in the first conductive layer.

According to another embodiment alternative to the second embodiment, a substrate is provided with a first conductive layer and a second conductive layer respectively formed on both sides of the substrate. A metal layer is formed on a bottom surface of the second conductive layer for blocking ultraviolet (UV) light. A first photoresist layer is formed on a top surface of the first conductive layer, and a second photoresist layer is formed on a bottom surface of the metal layer. The first photoresist layer and the second photoresist layer are exposed to ultraviolet lights respectively, wherein the ultraviolet lights from either side of the substrate are blocked from each other by the metal layer. Both sides of the substrate are developed such that regions of the first conductive layer and the metal layer are exposed. The exposed regions of the first conductive layer and the metal layer are etched, thereby resulting in a first conductive film in the first conductive layer, and resulting in a metal circuit layer in the metal layer. A third photoresist layer is formed on bottom surfaces of the metal circuit layer and the second conductive layer. The third photoresist layer is exposed and developed such that regions of the second conductive layer are exposed. The exposed regions of the second conductive layer are etched, thereby resulting in a second conductive film in the second conductive layer.

BRIEF DESCRIPTION OF THE DRAWINGS

Many aspects of the embodiments can be better understood with reference to the following drawings. The components in the drawings are not necessarily to scale, emphasis instead being placed upon clearly illustrating the principles of the present disclosures. Moreover, in the drawings, like reference numerals designate corresponding parts throughout the several views.

FIG. 1 through FIG. 8 are cross-sectional views illustrating a method of forming double-sided patterns in a touch panel circuit according to a first embodiment of the present invention, in which FIG. 1 is a cross-sectional view showing that a blocking layer is formed on a first conductive layer;

FIG. 2 is a cross-sectional view showing that marks are made, using laser, in a first photoresist layer for the purpose of alignment in later exposure process;

FIG. 3 is a cross-sectional view showing that a second photoresist layer is formed on a second conductive layer;

FIG. 4 is a cross-sectional view showing that the first photoresist layer is subjected to exposure process;

FIG. 5 is a cross-sectional view showing that the second photoresist layer is subjected to exposure;

FIG. 6 is a cross-sectional view showing the resultant structure after both sides of the substrate have been developed;

FIG. 7 is a cross-sectional view showing the resultant structure after both sides of the substrate have been etched;

FIG. 8 is a cross-sectional view showing the touch panel circuit;

FIG. 9 and FIG. 10 are cross-sectional views illustrating a method of forming double-sided patterns in a touch panel circuit according to another embodiment alternative to the first embodiment, in which FIG. 9 is a cross-sectional view showing that a first photoresist layer and a second photoresist layer are formed;

FIG. 10 is a cross-sectional view showing the resultant structure after the structure of FIG. 9 is subjected to exposure, developing and etching;

FIG. 11 and FIG. 12 are cross-sectional views illustrating a method of forming double-sided patterns in a touch panel circuit according to still another embodiment alternative to the first embodiment, in which FIG. 11 is a cross-sectional view showing that a first photoresist layer and a second photoresist layer are formed;

FIG. 12 is a cross-sectional view showing the resultant structure after the structure of FIG. 11 is subjected to exposure, developing and etching;

FIG. 13 and FIG. 14 are cross-sectional views illustrating a method of forming double-sided patterns in a touch panel circuit according to a further embodiment alternative to the first embodiment, in which FIG. 13 is a cross-sectional view showing that a first photoresist layer and a second photoresist layer are formed;

FIG. 14 is a cross-sectional view showing the resultant structure after the structure of FIG. 13 is subjected to exposure, developing and etching;

FIG. 15 through FIG. 27 are cross-sectional views illustrating a method of forming double-sided patterns in a touch panel circuit according to a second embodiment of the present invention, in which FIG. 15 is a cross-sectional view showing that a metal layer is formed on a top surface of the first conductive layer;

FIG. 16 is a cross-sectional view showing that marks are made, using laser, in a first photoresist layer and the metal layer for the purpose of alignment in later exposure process;

FIG. 17 is a cross-sectional view showing that a second photoresist layer is formed on a second conductive layer;

FIG. 18 is a cross-sectional view showing that the first photoresist layer is subjected to exposure;

FIG. 19 is a cross-sectional view showing that the second photoresist layer is subjected to exposure;

FIG. 20 is a cross-sectional view showing the resultant structure after both sides of the substrate have been developed;

FIG. 21 is a cross-sectional view showing the resultant structure after both sides of the substrate have been etched;

FIG. 22 is a cross-sectional view showing the resultant structure after the remaining photoresist layers are removed;

FIG. 23 is a cross-sectional view showing that a third photoresist layer is formed on the first conductive layer;

FIG. 24 is a cross-sectional view showing that the third photoresist layer is subjected to exposure;

FIG. 25 is a cross-sectional view showing that a fourth photoresist layer is formed on a second conductive film and the substrate;

FIG. 26 is a cross-sectional view showing the resultant structure after the substrate has been etched;

FIG. 27 is a cross-sectional view showing the touch panel circuit;

FIG. 28 and FIG. 29 are cross-sectional views illustrating a method of forming double-sided patterns in a touch panel circuit according to another embodiment alternative to the second embodiment, in which FIG. 28 is a cross-sectional view showing that a first photoresist layer and a second photoresist layer are formed; and FIG. 29 is a cross-sectional view showing the resultant structure after the structure of FIG. 28 is subjected to exposure, developing and etching.

DETAILED DESCRIPTION OF THE INVENTION

First Embodiment

FIG. 1 through FIG. 8 are cross-sectional views illustrating a method of forming double-sided patterns in a touch panel circuit according to a first embodiment of the present invention. In the embodiment, the method includes the following steps (1) to (10).

Figure 1:
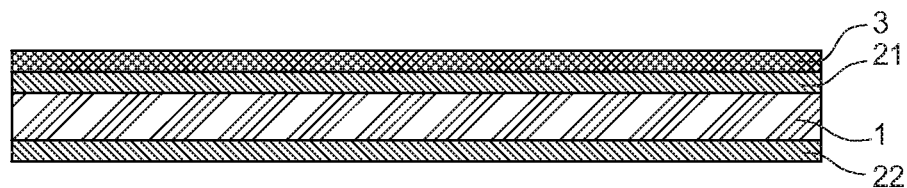

Step (1) As shown in FIG. 1, a transparent substrate 1 is subjected to vacuum sputtering in sputtering equipment in order to form a first (electrically) conductive layer 21 on a top surface of the substrate 1. A second conductive layer 22 is also formed on a bottom surface of the substrate 1. The substrate 1 may contain glass, plastic film or plastic shell. The first conductive layer 21 and the second conductive layer 22 may contain indium tin oxide (ITO) or other transparent conductive material.

Step (2) Still referring to FIG. 1, a blocking layer 3 is formed on a top surface of the first conductive layer 21 for blocking ultraviolet (UV) light. The blocking layer 3 is baked to be adhered to the top surface of the first conductive layer 21. The blocking layer 3 may contain UV-blocking organic material such as resin or photoresist. Alternatively, the blocking layer 3 may contain UV-blocking inorganic material made of $TiO_2$ and $SiO_2$, or made of $Ta_2O_5$ and $SiO_2$.

Figure 2:
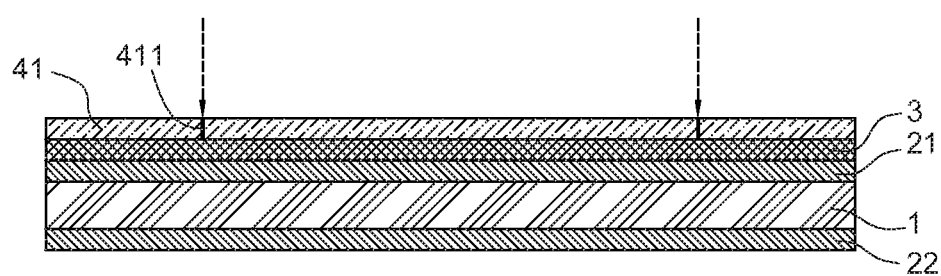

Step (3) Referring to FIG. 2, a first photoresist layer 41 is formed on a top surface of the blocking layer 3. The first photoresist layer 41 is then baked to be adhered to the top surface of the blocking layer 3.

Step (4) Still referring to FIG. 2, at least one mark 411 is made, using laser, in the first photoresist layer 41 for the purpose of alignment in later exposure process. The mark 411 may have the shape of a cross.

Figure 3:
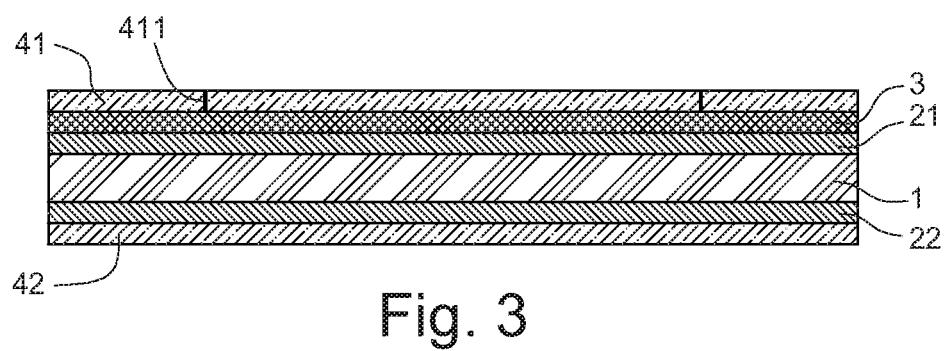

Step (5) Referring to FIG. 3, a second photoresist layer 42 is formed on a bottom surface of the second conductive layer 22. The second photoresist layer 42 is baked to be adhered to the bottom surface of the second conductive layer 22. In the embodiment, the first photoresist layer 41 and the second photoresist layer 42 may be positive photoresist. It is appreciated that negative photoresist may be well adapted to the first photoresist layer 41 and the second photoresist layer 42.

Figure 4:
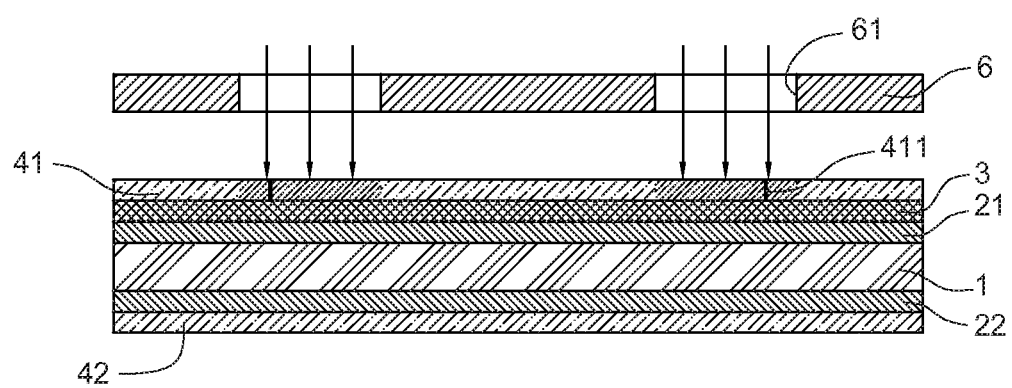

Step (6) Referring to FIG. 4, the first photoresist layer 41 is covered with a first photomask 6 having a pattern 61. Ultraviolet light provided by an ultraviolet source then passes through holes of the pattern 61 to subject the first photoresist layer 41 to exposure process. During the exposure of the first photoresist layer 41, the blocking layer 3 blocks the second photoresist layer 42 from being affected by the ultraviolet light.

Figure 5:
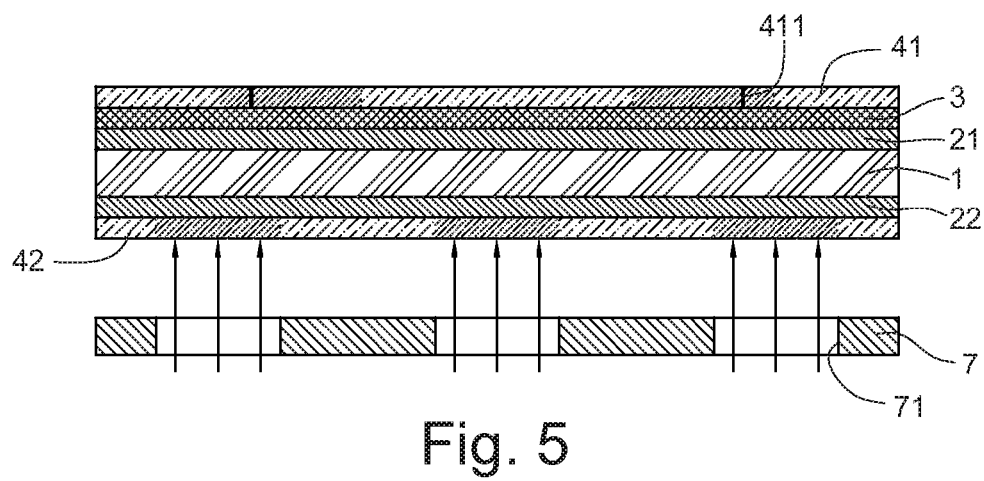

Step (7) Referring to FIG. 5, the second photoresist layer 42 is covered with a second photomask 7 having a pattern 71. The second photomask 7 is aligned with the second photoresist layer 42 with the aid of the mark 411 of the first photoresist layer 41. For example, an imaging device, such as a charge-coupled device (CCD) is used to identify and capture the mark 411, which is then utilized to align the second photomask 7 with the second photoresist layer 42. Ultraviolet light provided by an ultraviolet source then passes through holes of the pattern 71 to subject the second photoresist layer 42 to exposure process. During the exposure of the second photoresist layer 42, the blocking layer 3 blocks the first photoresist layer 41 from being affected by the ultraviolet light coming from the second photoresist layer 42. The first photoresist layer 41 and the second photoresist layer 42 may be subjected to the exposure process successively in any order or at the same time.

Figure 6:
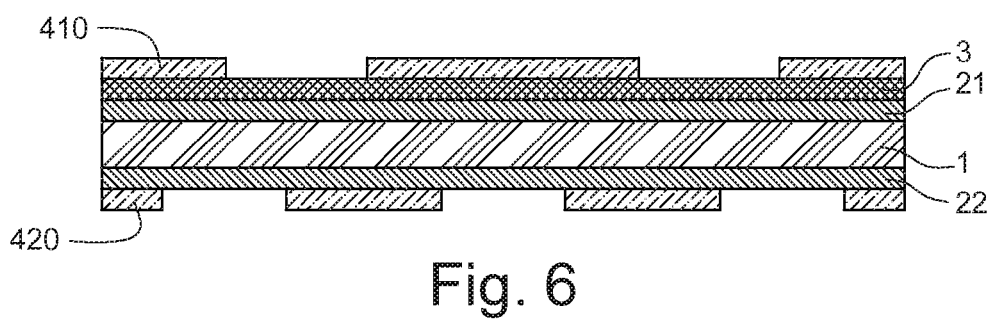

Step (8) Referring to FIG. 6, on either side of the substrate 1, the exposed regions of the first photoresist layer 41 and the second photoresist layer 42 are removed by a developer solution. As a result, portions of the blocking layer 3 and the second conductive layer 22 are not only being exposed and developed but also being subjected to etching later.

Figure 7:
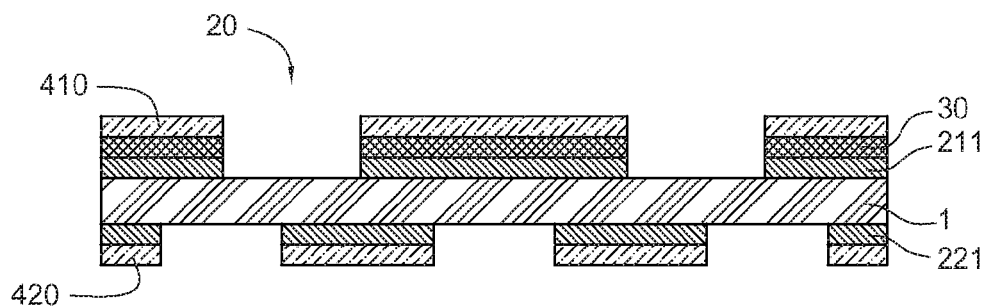

Step (9) Referring to FIG. 6 and FIG. 7, on either side of the substrate 1, the exposed regions of the blocking layer 3 and the second conductive layer 22 are removed or etched by an etchant. Further, the regions of the first conductive layer 21 that are under the exposed regions of the blocking layer 3 are also removed by the etchant. As a result, a first conductive film 211 for the touch panel circuit 20 is formed in the first conductive layer 21, and a second conductive film 221 for the touch panel circuit 20 is formed in the second conductive layer 22 as shown in FIG. 7.

Figure 8:
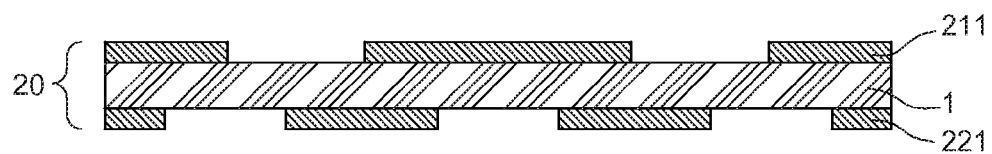

Step (10) Referring to FIG. 7 and FIG. 8, the remaining first photoresist layer 410 over the first conductive film 211 and the remaining second photoresist layer 420 on the second conductive film 221 are removed by alkali stripping. Further, the remaining blocking layer 30 is also removed, thereby exposing the first conductive film 211 and the second conductive film 221.

According to the embodiment described above, the blocking layer 3 made of UV-blocking material is used to block the ultraviolet lights coming from either side of the substrate 1, such that these ultraviolet lights may not interfere with each other, thereby ensuring the exposure quality of the first photoresist layer 41 and the second photoresist layer 42. The laser-made mark 411 in the first photoresist layer 41 is used for the purpose of alignment in the exposure process, thereby forming the patterns of the conductive films 211/221 in a single photolithography process. In other words, the exposure process on the second side may be performed without waiting the completion of the first conductive film, thereby simplifying the process, and thus reducing the time and cost, of manufacturing the touch panel circuit 20.

Moreover, the mark 411 in step (4) may be made after the first photoresist layer 41 in step (3) and the second photoresist layer 42 in step (5) have been formed. Accordingly, the first photoresist layer 41 and the second photoresist layer 42 may be formed at the same time in order to shorten the process.

Alternative First Embodiment

Figure 9:
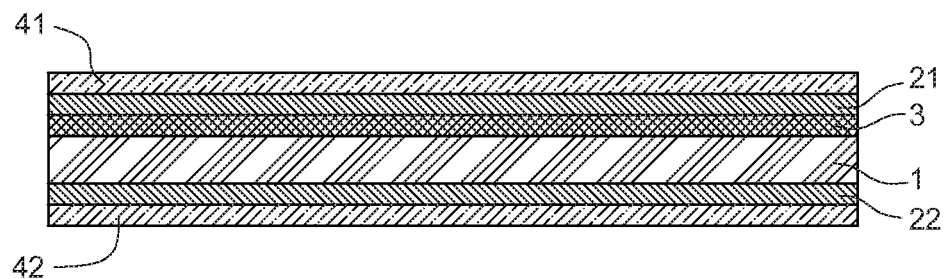
Figure 10:
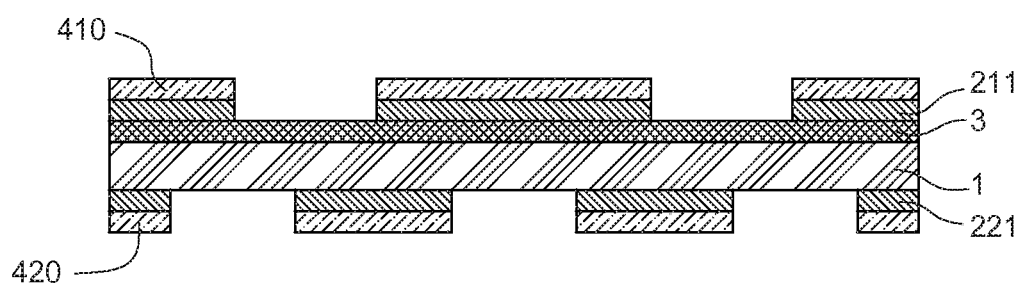

FIG. 9 and FIG. 10 are cross-sectional views illustrating a method of forming double-sided patterns in a touch panel circuit according to another embodiment alternative to the first embodiment depicted in FIG. 1 to FIG. 8.

Referring to FIG. 9, a blocking layer 3 is formed on a top surface of the substrate 1 for blocking ultraviolet (UV) light. A first conductive layer 21 is formed on a top surface of the blocking layer 3, and a second conductive layer 22 is formed on a bottom surface of the substrate 1. Subsequently, a first photoresist layer 41 is formed on a top surface of the first conductive layer 21, and a second photoresist layer 42 is formed on a bottom surface of the second conductive layer 22. After exposing and developing the first photoresist layer 41 and the second photoresist layer 42, portions of the first conductive layer 21 and the second conductive layer 22 are exposed and are then subjected to etching. As a result, a first conductive film 211 is formed in the first conductive layer 21, and a second conductive film 221 is formed in the second conductive layer 22 as shown in FIG. 10. Other steps of the present embodiment are similar to those of the first embodiment depicted in FIG. 1 to FIG. 8.

Alternative First Embodiment

Figure 11:
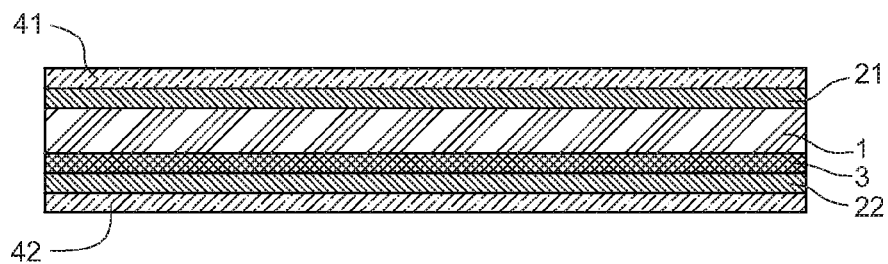
Figure 12:
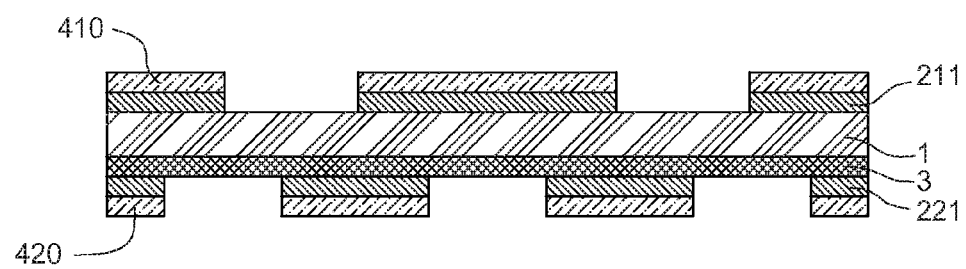

FIG. 11 and FIG. 12 are cross-sectional views illustrating a method of forming double-sided patterns in a touch panel circuit according to still another embodiment alternative to the first embodiment depicted in FIG. 1 to FIG. 8.

Referring to FIG. 11, a blocking layer 3 is formed on a bottom surface of the substrate 1 for blocking ultraviolet (UV) light. A first conductive layer 21 is formed on a top surface of the substrate 1, and a second conductive layer 22 is formed on a bottom surface of the blocking layer 3. Subsequently, a first photoresist layer 41 is formed on a top surface of the first conductive layer 21, and a second photoresist layer 42 is formed on a bottom surface of the second conductive layer 22. After exposing and developing the first photoresist layer 41 and the second photoresist layer 42, portions of the first conductive layer 21 and the second conductive layer 22 are exposed and are then subjected to etching. As a result, a first conductive film 211 is formed in the first conductive layer 21, and a second conductive film 221 is formed in the second conductive layer 22 as shown in FIG. 12. Other steps of the present embodiment are similar to those of the first embodiment depicted in FIG. 1 to FIG. 8.

Alternative First Embodiment

Figure 13:
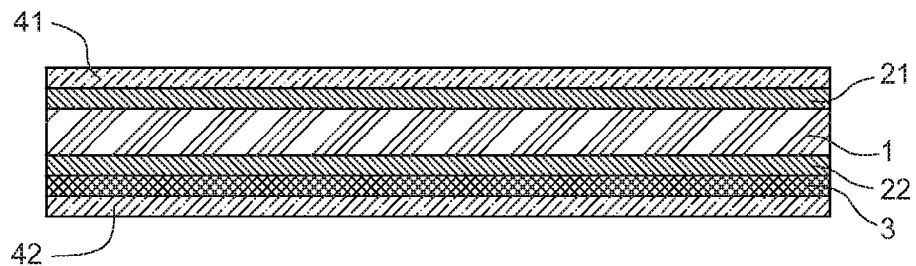
Figure 14:
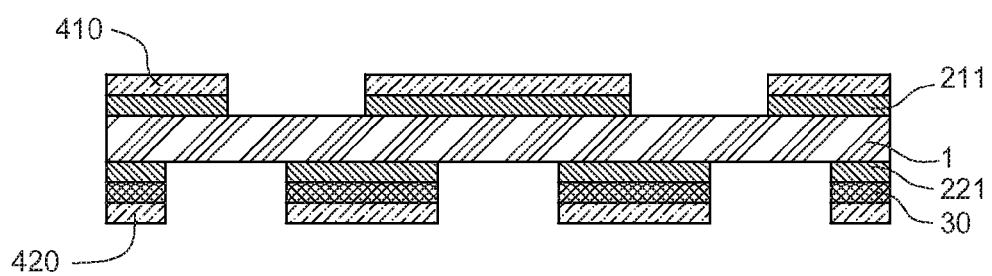

FIG. 13 and FIG. 14 are cross-sectional views illustrating a method of forming double-sided patterns in a touch panel circuit according to a further embodiment alternative to the first embodiment depicted in FIG. 1 to FIG. 8.

Referring to FIG. 13, a first conductive layer 21 is formed on a top surface of the substrate 1, and a second conductive layer 22 is formed on a bottom surface of the substrate 1. A blocking layer 3 is formed on a bottom surface of the second conductive layer 2 for blocking ultraviolet (UV) light. Subsequently, a first photoresist layer 41 is formed on a top surface of the first conductive layer 21, and a second photoresist layer 42 is formed on a bottom surface of the blocking layer 3. After exposing and developing the first photoresist layer 41 and the second photoresist layer 42, portions of the first conductive layer 21 and the blocking layer 3 are exposed and are then subjected to etching. As a result, a first conductive film 211 is formed in the first conductive layer 21, and a second conductive film 221 is formed in the second conductive layer 22 as shown in FIG. 14. Other steps of the present embodiment are similar to those of the first embodiment depicted in FIG. 1 to FIG. 8.

Second Embodiment

FIG. 15 through FIG. 27 are cross-sectional views illustrating a method of forming double-sided patterns in a touch panel circuit according to a second embodiment of the present invention. In the embodiment, the method includes the following steps (1) to (16).

Figure 15:
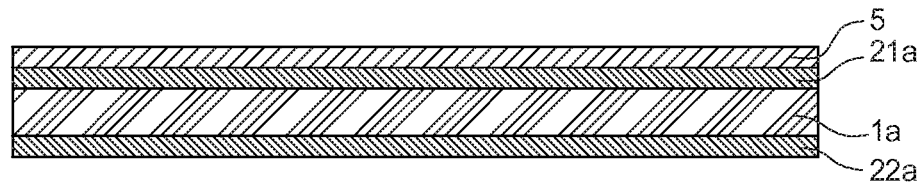

Step (1) As shown in FIG. 15, a transparent substrate 1a is subjected to vacuum sputtering in sputtering equipment in order to form a first conductive layer 21a on a top surface of the substrate 1a. A second conductive layer 22a is also formed on a bottom surface of the substrate 1a. The substrate 1a may contain glass, plastic film or plastic shell. The first conductive layer 21a and the second conductive layer 22a may contain indium tin oxide (ITO) or other transparent conductive material.

Step (2) Still referring to FIG. 15, the substrate 1a is subjected to vacuum sputtering in another sputtering equipment in order to form a metal layer 5 on a top surface of the first conductive layer 21a.

Figure 16:
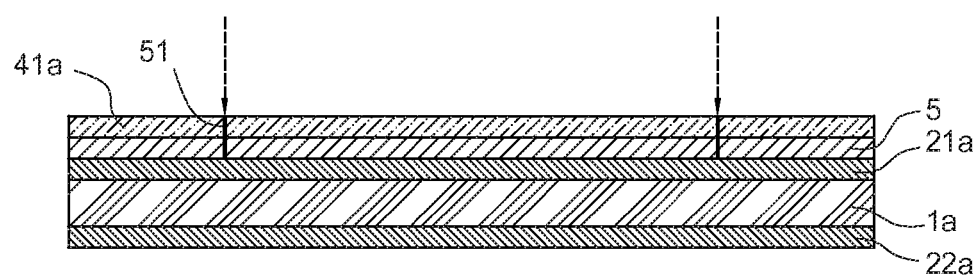

Step (3) Referring to FIG. 16, a first photoresist layer 41a is formed on a top surface of the metal layer 5. The first photoresist layer 41 is then baked to be adhered to the top surface of the metal layer 5.

Step (4) Still referring to FIG. 16, at least one mark 51 is made, using laser, in the first photoresist layer 41a and the metal layer 5 for the purpose of alignment in later exposure process. The mark 51 may have the shape of a cross.

Figure 17:
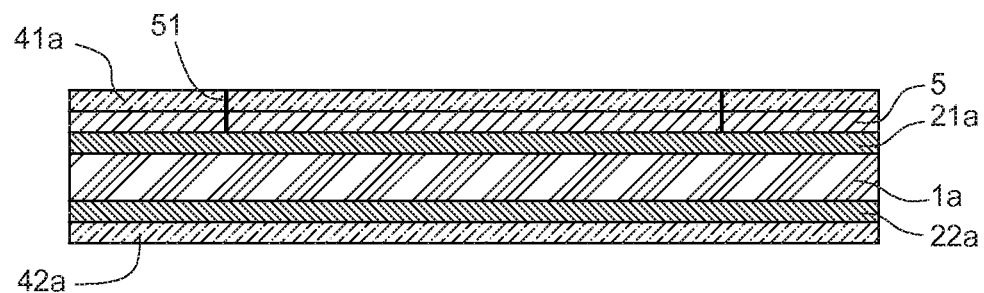

Step (5) Referring to FIG. 17, a second photoresist layer 42a is formed on a bottom surface of the second conductive layer 22a. The second photoresist layer 42a is baked to be adhered to the bottom surface of the second conductive layer 22a. In the embodiment, the first photoresist layer 41a and the second photoresist layer 42a may be positive photoresist. It is appreciated that negative photoresist may be well adapted to the first photoresist layer 41a and the second photoresist layer 42a.

Figure 18:
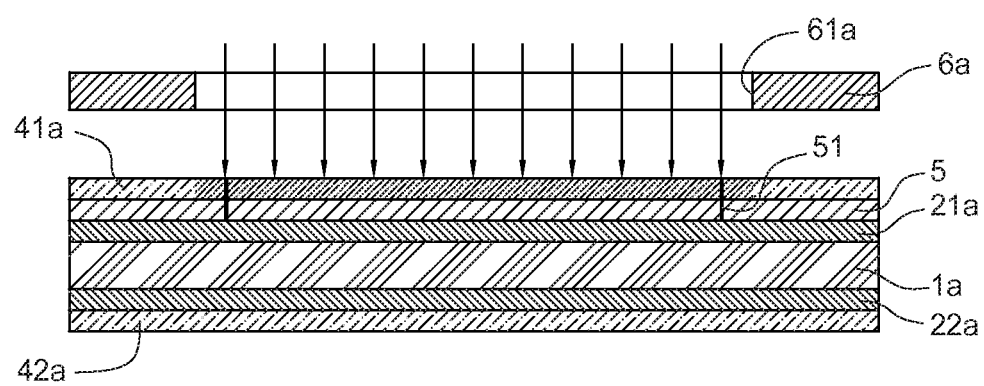

Step (6) Referring to FIG. 18, the first photoresist layer 41a is covered with a first photomask 6a having a pattern 61a. Ultraviolet light provided by an ultraviolet source then passes through holes of the pattern 61a to subject the first photoresist layer 41a to exposure process. During the exposure of the first photoresist layer 41a, the metal layer 5 blocks the second photoresist layer 42a from being affected by the ultraviolet light.

Figure 19:
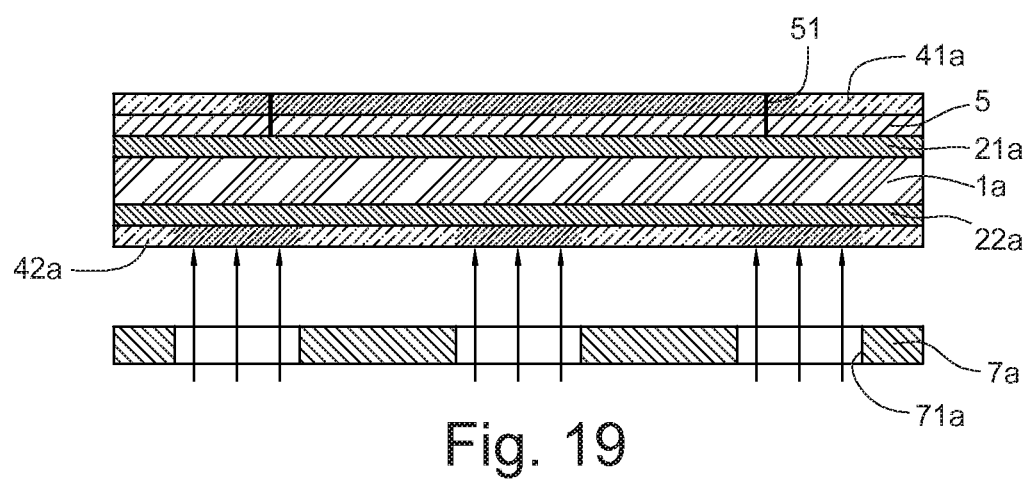

Step (7) Referring to FIG. 19, the second photoresist layer 42a is covered with a second photomask 7a having a pattern 71a. The second photomask 7a is aligned with the second photoresist layer 42a with the aid of the mark 51 of the metal layer 5. For example, an imaging device is used to identify and capture the mark 51, which is then utilized to align the second photomask 7a with the second photoresist layer 42a. Ultraviolet light provided by an ultraviolet source then passes through holes of the pattern 71a to subject the second photoresist layer 42a to exposure process. During the exposure of the second photoresist layer 42a, the metal layer 5 blocks the first photoresist layer 41a from being affected by the ultraviolet light coming from the second photoresist layer 42a. The first photoresist layer 41a and the second photoresist layer 42a may be subjected to the exposure process successively in any order or at the same time.

Figure 20:
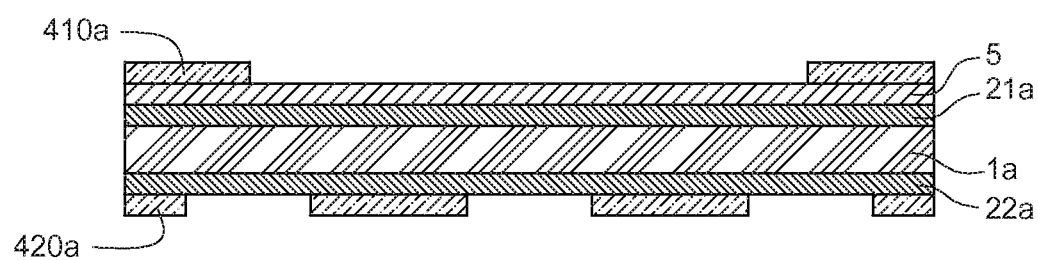

Step (8) Referring to FIG. 19 and FIG. 20, on either side of the substrate 1a, the exposed regions of the first photoresist layer 41a and the second photoresist layer 42a are removed by a developer solution. As a result, portions of the metal layer 5 and the second conductive layer 22a are exposed and are subjected to etching later.

Figure 21:
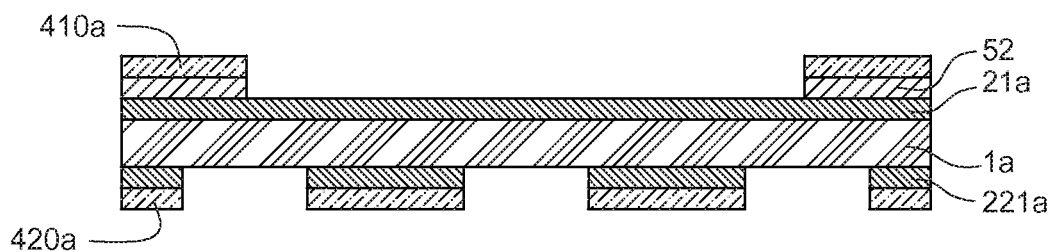

Step (9) Referring to FIG. 20 and FIG. 21, on either side of the substrate 1a, the exposed regions of the metal layer 5 and the second conductive layer 22a are removed or etched by an etchant. As a result, a metal circuit layer 52 for the touch panel circuit 20a (FIG. 27) is formed in the metal layer 5, and a second conductive film 221a for the touch panel circuit 20a is formed in the second conductive layer 22a.

Figure 22:
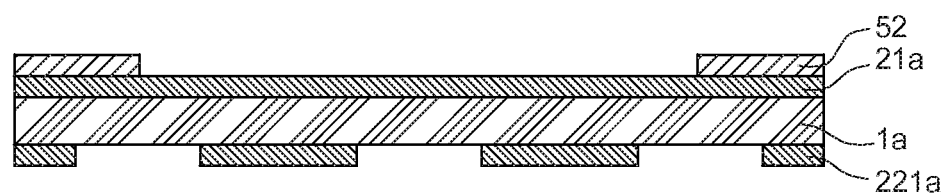

Step (10) Referring to FIG. 21 and FIG. 22, the remaining first photoresist layer 410a on the metal circuit layer 52 and the remaining second photoresist layer 420a on the second conductive film 221a are removed by alkali stripping, thereby exposing the metal circuit layer 52, the first conductive layer 21a and the second conductive film 221a as shown in FIG. 22.

Figure 23:
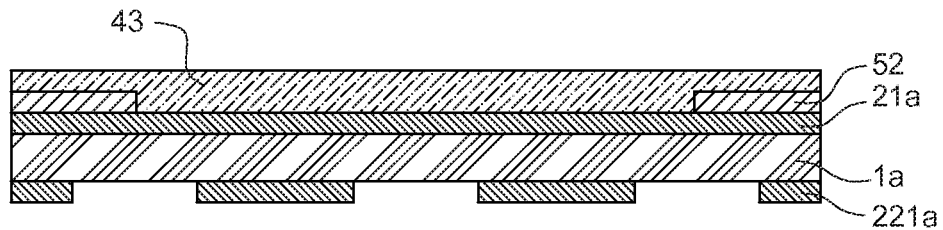

Step (11) Referring to FIG. 23, a third photoresist layer 43 is formed on top surfaces of the metal circuit layer 52 and the first conductive layer 21a. The third photoresist layer 43 is then baked to be adhered to the top surfaces of the metal circuit layer 52 and the first conductive layer 21a.

Figure 24:
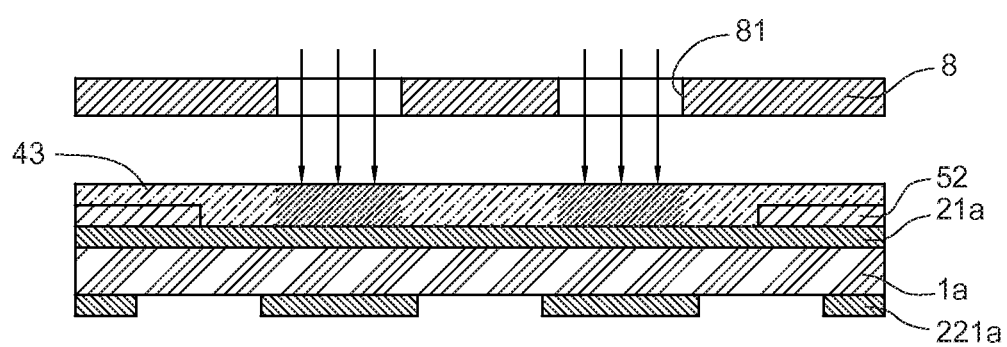

Step (12) Referring to FIG. 24, the third photoresist layer 43 is covered with a third photomask 8 having a pattern 81. Ultraviolet light provided by an ultraviolet source then passes through holes of the pattern 81 to subject the third photoresist layer 43 to exposure process.

Figure 25:
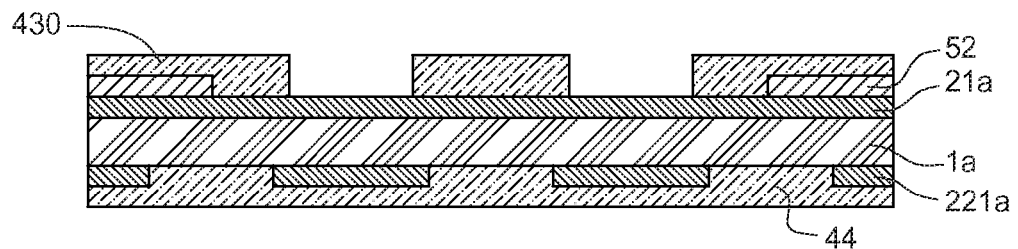

Step (13) Referring to FIG. 24 and FIG. 25, the exposed regions of the third photoresist layer 43 are removed by a developer solution. As a result, portions of the first conductive layer 21a are exposed and are subjected to etching later.

Step (14) Still referring to FIG. 25, a fourth photoresist layer 44 is formed on bottom surfaces of the second conductive film 221a and the substrate 1a. The fourth photoresist layer 44 is then baked to be adhered to the bottom surfaces of the second conductive film 221a and the substrate 1a in order to protect the second conductive film 221a.

Figure 26:
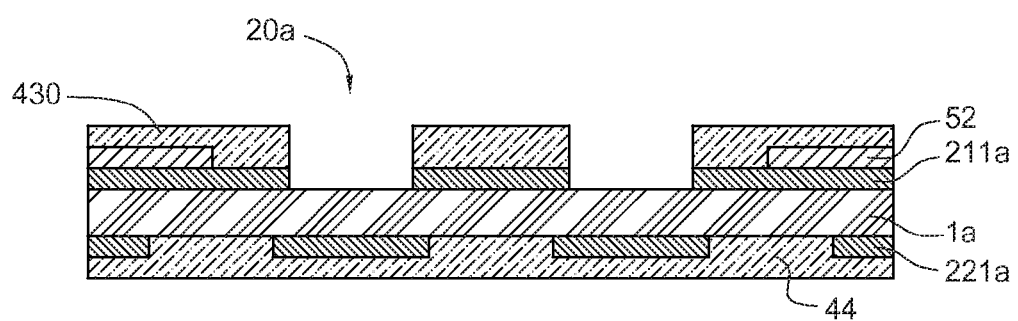

Step (15) Referring to FIG. 25 and FIG. 26, the exposed regions of the first conductive layer 21a are removed or etched by an etchant. As a result, a first conductive film 211a for the touch panel circuit 20a is formed in the first conductive layer 21a.

Figure 27:
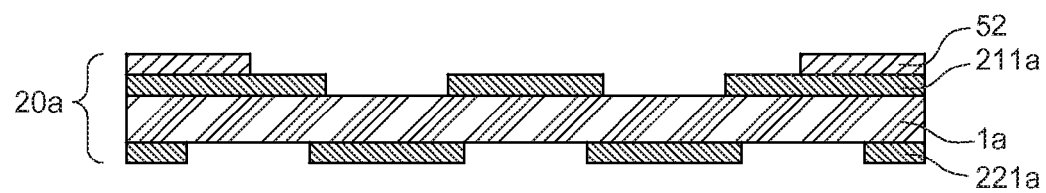

Step (16) Referring to FIG. 26 and FIG. 27, the remaining third photoresist layer 430 on the metal circuit layer 52 and the first conductive film 211a, and the remaining fourth photoresist layer 44 on the second conductive film 221a and the substrate 1a are removed by alkali stripping, thereby exposing the metal circuit layer 52, the first conductive film 211a and the second conductive film 221a as shown in FIG. 27.

Accordingly, the first conductive film 211a and the second conductive film 221a are formed on respective side of the substrate 1a. Further, the metal circuit layer 52 is formed on the edge surface of the first conductive film 211a, thereby advantageously reducing the impedance between the first conductive film 211a and the metal circuit layer 52.

According to the embodiment described above, the metal circuit layer 52 and the second conductive film 221a may be formed at the same time, and the patterns of the double-sided conductive films 211a/221a and the metal circuit layer 52 may be formed in very few photolithography processes, thereby simplifying the process, and thus reducing the time and cost, of manufacturing the touch panel circuit 20a.

Alternative Second Embodiment

Figure 28:
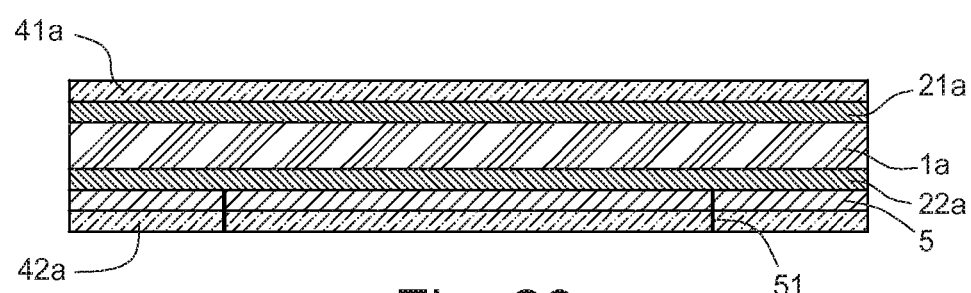
Figure 29:
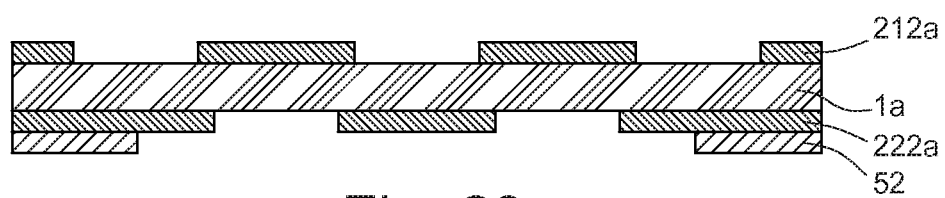

FIG. 28 and FIG. 29 are cross-sectional views illustrating a method of forming double-sided patterns in a touch panel circuit according to another embodiment alternative to the second embodiment depicted in FIG. 15 to FIG. 27.

Referring to FIG. 28, a metal layer 5 is formed on a bottom surface of a second conductive layer 22a for blocking ultraviolet (UV) light. Subsequently, a first photoresist layer 41a is formed on a top surface of a first conductive layer 21a, and a second photoresist layer 42a is formed on a bottom surface of the meal layer 5. At least one mark 51 is made, using laser, in the second photoresist layer 42a and the metal layer 5 for the purpose of alignment in later exposure process. After exposing and developing the first photoresist layer 41a and the second photoresist layer 42a, portions of the first conductive layer 21a and the metal layer 5 are exposed and are then subjected to etching. As a result, a first conductive film 212a is formed in the first conductive layer 21a, a metal circuit layer 52 is formed in the metal layer 5, and the second conductive layer 22a is exposed. The second conductive layer 22a is then subjected to further photolithography, thereby resulting in a second conductive film 222a in the second conductive layer 22a. Other steps of the present embodiment are similar to those of the second embodiment depicted in FIG. 15 to FIG. 27.

Accordingly, the first conductive film 212a and the second conductive film 222a are formed on respective side of the substrate 1a. Further, the metal circuit layer 52 is formed on the edge surface of the second conductive film 222a, thereby advantageously reducing the impedance between the second conductive film 222a and the metal circuit layer 52.

According to the embodiment described above, the metal circuit layer 52 and the first conductive film 212a may be formed at the same time, and the patterns of the double-sided conductive films 212a/222a and the metal circuit layer 52 may be formed in very few photolithography processes, thereby simplifying the process, and thus reducing the time and cost, of manufacturing the touch panel circuit 20a.

Moreover, the mark 51 in step (4) may be made in the metal circuit layer 52 after the first photoresist layer 41a in step (3) and the second photoresist layer 42a in step (5) have been formed. Accordingly, the first photoresist layer 41a and the second photoresist layer 42a may be formed at the same time in order to shorten the process.

Although specific embodiments have been illustrated and described, it will be appreciated by those skilled in the art that various modifications may be made without departing from the scope of the present invention, which is intended to be limited solely by the appended claims.

What is claimed is:

1. A method of forming double-sided patterns in a touch panel circuit, comprising:
    providing a substrate with a first conductive layer and a second conductive layer respectively formed on the top side and bottom side of the substrate;
    forming a blocking layer on a top surface of the first conductive layer for blocking ultraviolet (UV) light:
    forming a first photoresist layer on a top surface of the blocking layer, and a second photoresist layer on a bottom surface of the second conductive layer;
    exposing the first photoresist layer and the second photoresist layer to ultraviolet lights respectively, wherein the ultraviolet lights from either side of the substrate are blocked from each other by the blocking layer;
    developing the both sides of the substrate such that regions of the first conductive layer and the second conductive layer are exposed to be etched; and
    etching the exposed regions of the first conductive layer and the second conductive layer at the same time, thereby resulting in a first conductive film in the first conductive layer, and resulting in a second conductive film in the second conductive layer.

2. The method of claim 1, wherein the first photoresist layer and the second photoresist layer comprise positive photoresist or negative photoresist.

3. The method of claim 1, wherein the first photoresist layer and the second photoresist layer are exposed successively or at the same time.

4. The method of claim 1, after the etching step, further comprising a step of removing the remaining first photoresist layer over the first conductive layer and the remaining second photoresist layer on the second conductive layer.

5. The method of claim 1, wherein the blocking layer comprises UV-blocking organic material.

6. The method of claim 5, wherein the organic material comprises resin or photoresist.

7. The method of claim 1, wherein the blocking layer comprises UV-blocking inorganic material.

8. The method of claim 7, wherein the inorganic material comprises $TiO_2$ and $SiO_2$, or comprises $Ta_2O_5$ and $SiO_2$.

9. The method of claim 1, before the first photoresist layer is exposed, further comprising a step of making at least one mark in the first photoresist layer by laser for aligning double sides of the first and the second photoresist layers.

10. The method of claim 9, before the second photoresist layer is exposed, further comprising a step of making at least one mark in the second photoresist layer by laser for aligning double sides of the first and the second photoresist layers.

11. A method of forming double-sided patterns in a touch panel circuit, comprising:
    providing a substrate with a blocking layer formed on a top surface of the substrate;
    forming a first conductive layer on a top surface of the blocking layer, and a second conductive layer on a bottom surface of the substrate;
    forming a first photoresist layer on a top surface of the first conductive layer, and a second photoresist layer on a bottom surface of the second conductive layer;
    exposing the first photoresist layer and the second photoresist layer to ultraviolet lights respectively, wherein the ultraviolet lights from either side of the substrate are blocked from each other by the blocking layer;
    developing the both sides of the substrate such that regions of the first conductive layer and the second conductive layer are exposed to be etched; and
    etching the exposed regions of the first conductive layer and the second conductive layer at the same time, thereby resulting in a first conductive film in the first conductive layer, and resulting in a second conductive film in the second conductive layer.

12. The method of claim 11, wherein the blocking layer comprises UV-blocking organic material.

13. The method of claim 11, wherein the blocking layer comprises UV-blocking inorganic material.

14. The method of claim 11, before the first photoresist layer is exposed, further comprising a step of making at least one mark in the first photoresist layer by laser for aligning double sides of the first and the second photoresist layers.

15. The method of claim 11, before the second photoresist layer is exposed, further comprising a step of making at least one mark in the second photoresist layer by laser for aligning double sides of the first and the second photoresist layers.

16. A method of forming double-sided patterns in a touch panel circuit, comprising:
    providing a substrate with a first conductive layer and a second conductive layer respectively formed on the top side and bottom side of the substrate;
    forming a metal layer on a top surface of the first conductive layer for blocking ultraviolet (UV) light;
    forming a first photoresist layer on a top surface of the metal layer, and a second photoresist layer on a bottom surface of the second conductive layer;
    exposing the first photoresist layer and the second photoresist layer to ultraviolet lights respectively, wherein the ultraviolet lights from either side of the substrate are blocked from each other by the metal layer;
    developing the both sides of the substrate such that regions of the metal layer and the second conductive layer are exposed to be etched; and
    etching the exposed regions of the metal layer and the second conductive layer, thereby resulting in a metal circuit layer in the metal layer, and resulting in a second conductive film in the second conductive layer.

17. The method of claim 16, wherein the first photoresist layer and the second photoresist layer comprise positive photoresist or negative photoresist.

18. The method of claim 16, before the first photoresist layer is exposed, further comprising a step of making at least one mark in the metal layer by laser for aligning double sides of the first and the second photoresist layers.

19. The method of claim 16, wherein the first photoresist layer and the second photoresist layer are exposed successively or at the same time.

20. The method of claim 16, wherein the exposed regions of the metal layer and the second conductive layer are etched successively or at the same time.

21. The method of claim 16, after resulting in the second conductive film, further comprising a step of forming a fourth photoresist layer on bottom surfaces of the second conductive film and the substrate.

22. The method of claim 16, further comprising:
    forming a third photoresist layer on top surfaces of the metal circuit layer and the first conductive layer;
    exposing and developing the third photoresist layer such that regions of the first conductive layer are exposed to be etched; and
    removing the exposed regions of the first conductive layer, thereby resulting in a first conductive film in the first conductive layer.

23. The method of claim 22, after resulting in the first conductive film, further comprising a step of removing the remaining third photoresist layer on the metal circuit layer and the first conductive film.

24. The method of claim 22, wherein the first conductive film and the second conductive film are formed on the two sides of the substrate respectively, and the metal circuit layer is formed on edge surface of the first conductive film.

* * * * *